United States Patent
Dijkstra

(10) Patent No.: US 6,795,841 B2
(45) Date of Patent: Sep. 21, 2004

(54) PARALLEL PROCESSING OF MULTIPLE DATA VALUES WITHIN A DATA WORD

(75) Inventor: Wilco Dijkstra, Cherry Hinton (GB)

(73) Assignee: Arm Limited, Cambridge (GB)

( * ) Notice: Subject to any disclaimer, the term of this patent is extended or adjusted under 35 U.S.C. 154(b) by 508 days.

(21) Appl. No.: 09/770,407

(22) Filed: Jan. 29, 2001

(65) Prior Publication Data

US 2001/0056451 A1 Dec. 27, 2001

(30) Foreign Application Priority Data

May 23, 2000 (GB) .............................. 0012544

(51) Int. Cl.⁷ .............................................. G06F 7/38
(52) U.S. Cl. .................... 708/445; 708/518; 708/551
(58) Field of Search ............................. 708/445, 518, 708/550–551

(56) References Cited

U.S. PATENT DOCUMENTS 5,754,461 A   5/1998   Horiuchi
5,883,824 A * 3/1999   Lee et al. .................... 708/445
6,512,523 B1 * 1/2003   Gross .......................... 708/445

FOREIGN PATENT DOCUMENTS

| EP | 0656582 A1 * | 6/1995 |
|----|--------------|--------|
| GB | 2 321 547    | 7/1998 |
| GB | 2 343 969    | 5/2000 |
| WO | WO95/17712   | 6/1995 |
| WO | WO97/33223   | 9/1997 |

* cited by examiner

Primary Examiner—Tan V. Mai
(74) Attorney, Agent, or Firm—Nixon & Vanderhye P.C.

(57) ABSTRACT

When performing data processing operations upon data words 2, 4 including a plurality of abutting data values a0, a1, a2, a3, b0, b1, b2 and b3 the results of the operation upon one data value may influence a neighboring data value in an undesired manner. An error correcting value 34 may be determined from the input data words 2, 4 and then combined with the intermediate result 32 to correct for any undesired interactions between adjacent data values.

16 Claims, 4 Drawing Sheets

|  |  |  |  |  | ROUNDING DOWN | ROUNDING UP |
|---|---|---|---|---|---|---|
| 30 — MASK = | 0001 | 0001 | 0001 | 0001 | | |
| 26 — A = | 1101 (13) | 0101 (5) | 1001 (9) | 0001 (1) | | |
| 28 — B = | 0010 (2) | 1101 (13) | 1111 (15) | 1000 (8) | | |
| 32 — A + B = | 10000 | 0011 | 1000 | 1001 | | |
| 34 — (A EOR B) AND MASK = | 0001 | 0000 | 0000 | 0001 | | |
| 36 — SUBTRACT & RIGHT SHIFT #1 = | 0111 (7) | 1001 (9) | 1100 (12) | 0100 (4) | | |
| 38 — ADD & RIGHT SHIFT #1 = | 1000 (8) | 1001 (9) | 1100 (12) | 0101 (5) | | |

FIG.3

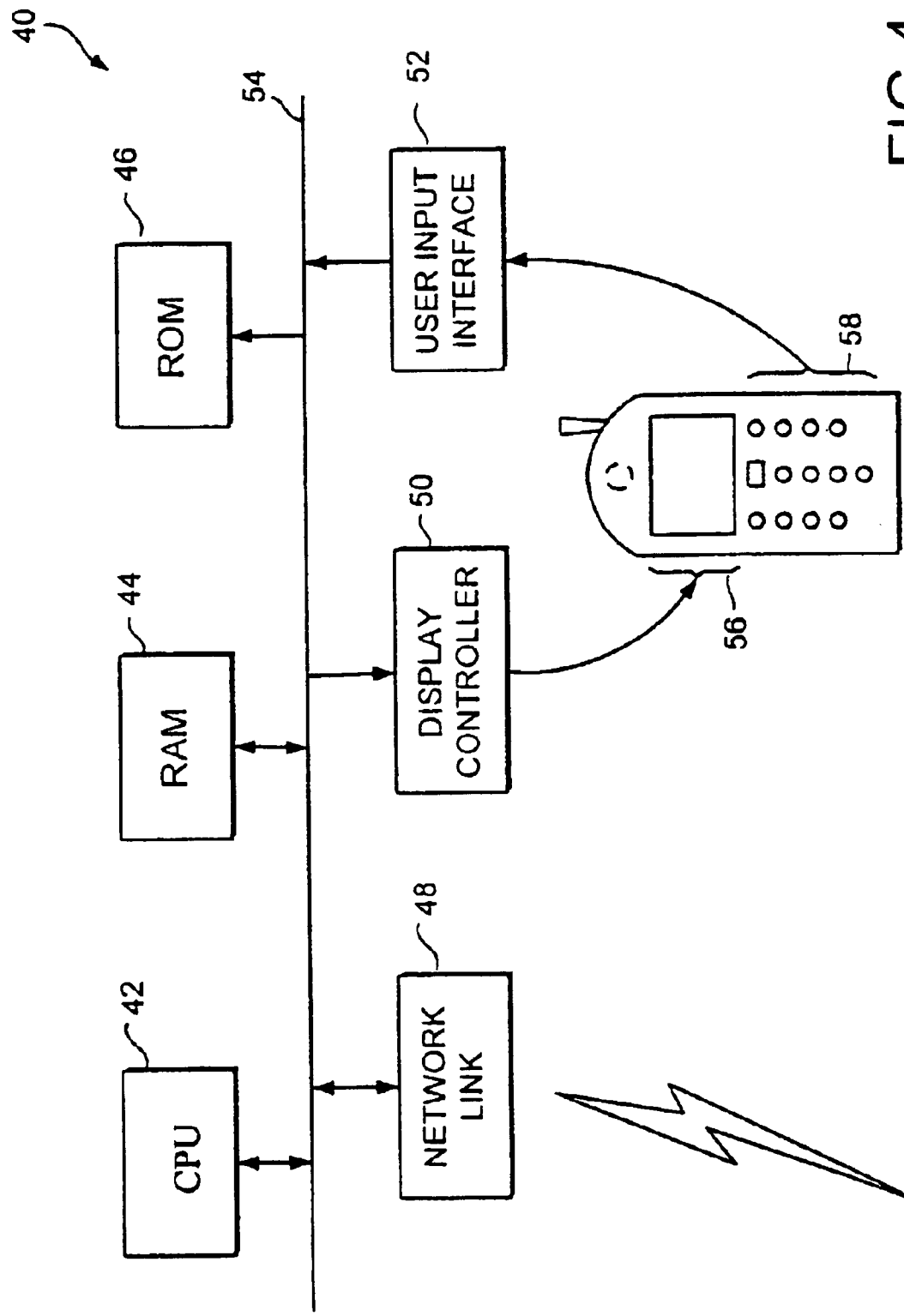

PARALLEL PROCESSING OF MULTIPLE DATA VALUES WITHIN A DATA WORD

BACKGROUND OF THE INVENTION

1. Field of the Invention

This invention relates to data processing. More particularly, this invention relates to data processing systems in which it is desired to perform parallel data processing upon a plurality of data values within a data word.

2. Description of the Prior Art

As data processing systems have developed, data path widths have generally become greater. This has led to the increased possibility that data values which it is desired to process may be much narrower in bit width than the data paths available through the processing hardware. As an example, if the processing hardware provides for 32-bit data processing operations to be performed, but the data values being processed are only 8-bit data values, then it is disadvantageously inefficient to separately process the 8-bit data values upon the much more capable 32-bit data paths.

A known technique for making better use of the data processing resources available in the above circumstances is "single instruction multiple data" instructions. These special purpose instructions effectively allow multiple data values to be embedded within a data word passing along the data paths of the system with processing operations being performed in parallel upon the plurality of data values embedded within each data word. The instructions control the hardware in a manner that ensures that the results of the processing of one data value are not allowed to interfere with the results of the processing of another data value, e.g. the carry chain of an adder is interrupted at positions between the data values such that a carry from the processing of one data value does not propagate into a neighbouring data value.

Whilst the provision of single instruction multiple data instructions does allow advantageous parallel processing of data values within a single data word, it suffers from the disadvantage that it occupies bit space within the instruction bit space of the data processing apparatus concerned and requires the provision of extra circuitry. Instruction bit space is a valuable resource within a data processing system architecture and increased circuit requirements increase cost, size, power consumption etc. A further disadvantage of the single instruction multiple data instruction approach is that the divisions between data values within a data word are determined by the hardware of the system which gives reduced flexibility in the way the system may be used, e.g. the hardware may assume that the data values are 16-bit data values with two data values being stored within a 32-bit data word, whereas a particular processing requirement might be to handle 8-bit data values, which make relatively inefficient use of a 16-bit data channel provided for them within the single instruction multiple data arrangement.

A further feature of many data processing systems is that data values to be processed in parallel are packed together within the memory of the data processing system in an abutting manner. Accordingly, if the data values to be processed are 8-bit byte values, then these will typically be stored as adjacent data values within a memory system with a plurality of these 8-bit byte values being read simultaneously as, for example, a 32-bit word from the memory system. In these circumstances, if it is desired to separately process the data values, then they must be unpacked from the data word in which they were all read, separately processed, and then repacked within a result data word prior to being stored back to the memory. The processing overhead of the unpacking and re-packing is disadvantageous.

Furthermore, the need to conduct such packing and re-packing and the inefficiency of separately processing data values frequently arises in circumstances, such as video data processing, which are already demanding considerable processing resources and so can ill afford the extra processing requirements.

It is known from the field of binary coded decimal (BCD) arithmetic to represent a decimal number by a collection of adjacent 4-bit codes within a word, each 4-bit code representing a decimal digit. In order to make adjacent decimal digits interact during, for example, an add, it is known to add six to each digit prior to the add and then subtract six from each digit after the add.

SUMMARY OF THE INVENTION

Viewed from one aspect the present invention provides a method of processing an input data word containing a plurality of abutting input data values, said method comprising the steps of:

(i) performing one or more data processing operations upon said input data word and a further data word to generate an intermediate result data word containing a plurality of abutting intermediate result data values dependent upon said input data values and corresponding portions of said further data word, said one or more data processing operations being such that a corrupting result bit from a first result data value may extend into and change a value of a second result data value;

(ii) calculating an error correcting data word in dependence upon said input data word and said further data word, said error correcting data word having a value that represents any corrupting result bits that may be generated by said step of performing;

(iii) combining said intermediate result data word and said error correcting data word to remove any change of value produced by a corrupting result bit and to generate an output data word, said output data word containing a plurality of abutting output data values being those that would be generated if said one or more data processing operations were performed upon said plurality input data values and said corresponding portions of said further data word in isolation from one another.

The invention recognises that the interactions between result data values that can corrupt one another may be identified. When these interactions have been so identified, their effect may be reversed by an appropriate additional processing step. Thus, an output data word may be produced containing output data values identical to those that would be produced if those output data values had been calculated from the input data values and respective corresponding portions of the further data word in isolation from each other, e.g. without any undesired interaction or corruption. Surprisingly, the extra work of identifying and then compensating for the undesired interactions is more than outweighed by the increase in processing efficiency yielded by being able to process multiple data values within a single data word simultaneously.

Whilst the invention could be applied to a variety of different data processing operations to be performed upon the input data word, it is particularly well suited to situations in which the one or more data processing operations include an addition operation. In these circumstances, the potentially corrupting interactions between data values can be efficiently identified and reversed.

Preferred embodiments of the invention are ones in which an addition operation takes place and the potential corruption being compensated for is where the lowest order bit of a first result data value undesirably changes the value of the highest order bit of a second result data value. In many real-life data processing situations, the high order bits are of more practical significance than the low order bits of results and so a low order bit may already effectively be being discarded.

The above considerations also apply in the case of a subtraction operation.

As a preferred example of the way in which the error correcting data word may be calculated, an exclusive OR operation may be performed between two data words to identify the potential corrupting result bit at each position.

The identification of potential corrupting result bits can be focused upon the boundaries between data values by a logical AND operation using a mask value that picks out bits at the data value boundaries.

It has been found that a rounding step may be advantageously combined with the error correcting process by either adding or subtracting an error correcting data word in accordance with the desired rounding mode.

The technique of the present invention could be applied in many different circumstances, but it is particularly suited to implementations in which the data being processed corresponds to adjacent signal values within a stream of signal values, such as adjacent pixel values. These situations require large volumes of data to be processed and so processing efficiency gains are highly significant.

Whilst the input data values could have a restricted range within their bit width, the chance of undesirable interactions between adjacent data values, and accordingly the worth of the invention, is greater in embodiments in which the data values extend over the full range of values allowed by their bit widths.

Viewed from another aspect the present invention provides an apparatus for processing an input data word containing a plurality of abutting input data values, said apparatus comprising:

(i) processing logic operable to perform one or more data processing operations upon said input data word and a further data word to generate an intermediate result data word containing a plurality of abutting intermediate result data values dependent upon said input data values and corresponding portions of said further data word, said one or more data processing operations being such that a corrupting result bit from a first result data value may extend into and change a value of a second result data value;

(ii) calculating logic operable to calculate an error correcting data word in dependence upon said input data word and said further data word, said error correcting data word having a value that represents any corrupting result bits that may be generated by said step of performing;

(iii) combining logic operable to combine said intermediate result data word and said error correcting data word to remove any change of value produced by a corrupting result bit and to generate an output data word, said output data word containing a plurality of abutting output data values being those that would be generated if said one or more data processing operations were performed upon said plurality input data values and said corresponding portions of said further data word in isolation from one another.

A further aspect the invention provides a computer program for controlling a data processing apparatus in accordance with the above described techniques. The computer program may be stored in various different ways, such as non-volatile memory or a magnetic or optical medium, or alternatively may be dynamically downloaded via a communications link to a data processing apparatus upon which it is desired to execute that computer program.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 is a simplified worked example of the technique of FIG. 2; and

FIG. 4 is a schematic illustration of a data processing apparatus for performing the processing techniques shown in FIGS. 1, 2 and 3.

DESCRIPTION OF THE PREFERRED EMBODIMENTS

Figure 1:
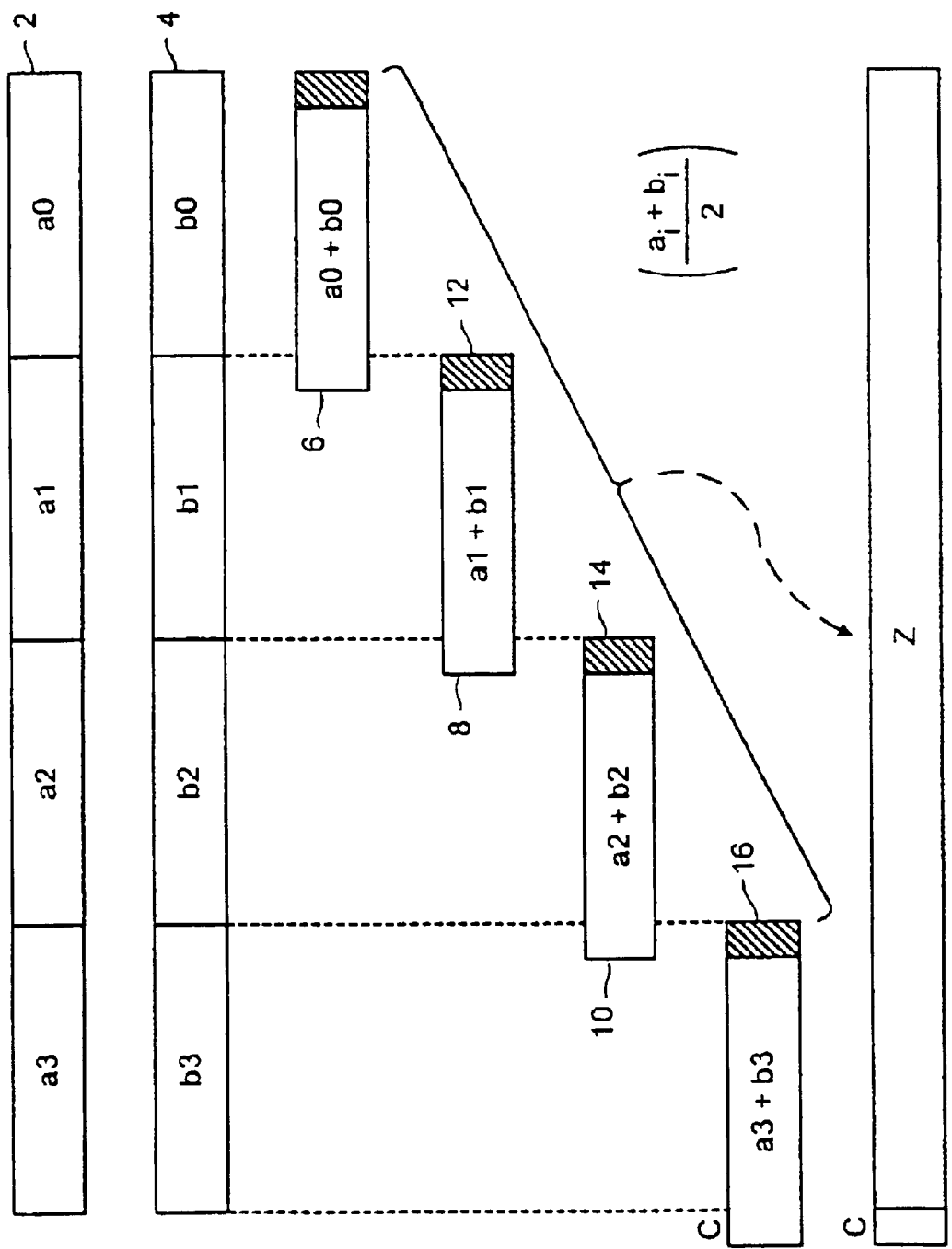
FIG. 1 schematically illustrates an example data processing operation in which undesired interaction occurs between result data values embedded within a single data word.

FIG. 1 schematically illustrates a desired data processing operation in which a first input data word 2 is added to a second input data word 4. Each of the input data words 2, 4 contains four abutting data values a0, a1, a2, a3, b0, b1, b2 and b3. The desired result is to produce an average of each of the data values, e.g. calculate (a0+b0)/2.

In the illustrated example the input data words 2, 4 are 32-bit data words and the input data values are 8-bit input data values. Accordingly, it will be appreciated that when two 8-bit data values are added together, then the result will be a 9-bit data value (at least prior to dividing by 2). As shown in FIG. 1, the most significant bits 6, 8 and 10 of three of the sum values overlie the least significant bits 12, 14 and 16 of the adjacent sum value. These least significant bits 12, 14 and 16 are not required since it is intended to divide the individual sum values by two and so these least significant bits will effectively be discarded.

The overlapping of the most significant bits 6, 8 and 10 with the undesired least significant bits 12, 14 and 16 has the effect that the least significant bits 12, 14 and 16 may alter the desired bit value of the most significant bits 6, 8 and 10 and can also undesirably alter the data value in which the least significant bit 12, 14 and 16 occurs.

A further point regarding FIG. 1 is that the most significant bit of the result a3+b3 is the carry bit C from the 32-bit addition. This desired bit can be recovered by an appropriate right shift that includes the carry bit C.

Figure 2:
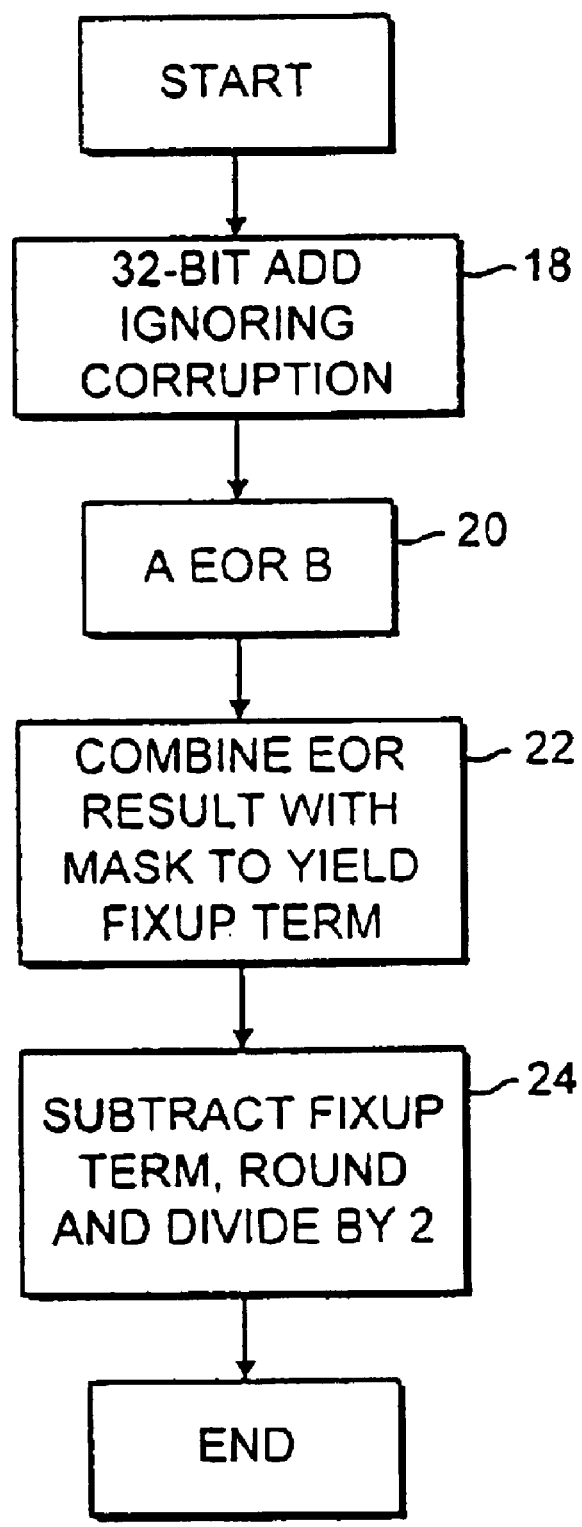
FIG. 2 is a flow diagram illustrating the technique of one embodiment of the invention.

FIG. 2 is a flow diagram illustrating a technique for overcoming the problem explained in relation to FIG. 1. At step 18, the two input data values 2, 4 (one of these corresponds to the further data value and one corresponds to the input data value as discussed in the introduction) are subject to a normal 32-bit addition operation with the carry flowing through all 32 bits. At this stage, the undesired lowest order bits 12, 14 and 16 will potentially have a corrupting effect altering the bit positions above them in an undesired manner.

Steps 20 and 22 seek to identify the corrupting result bits 12, 14 and 16 and yield a error correcting data value (fixup term) that may be used to correct the 32-bit sum that has been calculated at step 18. Step 20 performs a logical exclusive OR operation between the input data words 2, 4. For each bit position, this operation yields a bit value equal to the lowest order bit that will be produced by adding the two bit values at that position from the input data words 2, 4. This calculates whether the corrupting result bits 12, 14 and 16 are either "0" or "1". Bit values of "0" in fact have no effect and need not be reversed.

Step 22 performs a logical AND operation between the result of step 20 and a mask value to isolate the bit values for the corrupting result bits 12, 14 and 16 within a 32-bit data word. In particular, the mask value has "0"s at all positions other than those corresponding to the potential corrupting result bits 12, 14 and 16.

Step 24 subtracts the error correcting data word calculated by step 22 from the result of the 32-bit addition performed at step 18. This subtracts out the corrupting result bits 12, 14 and 16 thereby returning the result data values that they may have influenced to the desired true result data values. Step 24 also right shifts the result by one bit position to effectively divide by two. This right shift shifts in the carry bit C and shifts out the lowest order bit of the result from a0+b0.

ARM code (for execution upon an ARM processor as produced by ARM Limited of Cambridge, Great Britain) for performing the technique illustrated in FIGS. 1 and 2 is given below:

```
;Rounding = 0 case

ADDS    z, x, y             ;perform add ignoring overflows
EOR     t, x, y             ;caculate an error fixup term
AND     t, mask, t, LSR#1
RSB     z, t, z, RRX        ;halve and correct, rounding down
>>
;Rounding = 1 case ADDS    z, x, y             ;perform add ignoring overflows
EOR     t, x, y             ;caculate an error fixup term
ANDS    t, mask, t, RRX
ADC     z, t, z, LSR#1      ;halve and correct, rounding up
```

The upper four lines of this code are one example in which the error correcting data word is subtracted from the potentially corrupted 32-bit addition result in a manner that rounds down the individual result data values embedded within the result data word. The bottom case adds in the error correcting data word in a manner that rounds up the result data values.

FIG. 3 illustrates a simplified worked example of the technique of the present invention. Lines 26 and 28 are 16-bit input data words each containing four 4-bit input data values. Line 30 is a mask value for selecting out the potentially corrupting result bits.

Line 32 is the result of an unmodified 16-bit addition of the input data words given at lines 26 and 28.

Line 34 is the result of an exclusive OR operation performed between the input data words of lines 26 and 28 together with a logical AND with the mask value from line 30. Accordingly, the result given in line 34 is the error correcting data word.

Line 36 is the result of subtracting the error correcting data word 34 from the 16-bit sum of line 32 and then right shifting by one bit position. This produces the corrected result data values representing the rounded down averages of the input data values from lines 26 and 28.

Line 38 is the result of adding the error correcting data word rather than subtracting it and produces the rounded up average of the input data values.

In the above examples the data processing operation being performed between the input data word and the further data word involved an addition and a shift. The technique of the invention is also applicable to data processing operations including a subtraction. An example of the use of the technique involving subtraction occurs within motion vector estimation for MPEG encoding. The ARM code sequence for such an example of the technique of the present invention involving a subtraction operation is given below:

a and b are the two input data words each containing four data values.

Registers x00010101 and x00FF00FF contain the two mask values 0x00010101 and 0x00FF00FF respectively.

The variable v at the end of execution holds the absolute value of the difference between respective data values.

```
EOR    t, a, b;      /*bit[8*k] = bottom bit of a[k]-b[k]*/
SUBS   v, a, b;      /*byte[k] = a[k]-b[k]-borrow[k-1],C=~borrow[3]*/
EOR    t, t, v;      /*bit[8*k] = borrow[k-1]*/
AND    t, x00010101,t,LSR#8
ORRCC  t, t, #1<<24 /*bit[8*k] = borrow[k]*/
RSB    t, t, t, LSL#8 /*byte[k] = 00 if no borrow, FF if borrow */
ADD    v, v, t      /*if byte[k]=v caused a borrow, fix borrow, v<-v-1 */
EOR    v, v, t      /* finish negation of all bytes that caused borrow */
```

FIG. 4 schematically illustrates a data processing apparatus for performing the techniques described previously. The data processing apparatus 40 includes a central processing unit 42, a random access memory 44, a read only memory 46, a network link 48, a display controller 50 and a user input interface 52 all linked via a common bus 54. The display controller 50 controls a display 56 and the user input interface 52 receives signals from a keypad 58. The data processing apparatus 40 may, by way of example, form part of a mobile telephone.

In this example, MPEG video data may be received via the network link 48 and require processing to produce output video data. This processing may include the interpolation of pixel values as described above. This interpolation is performed by the central processing unit 42 operating upon the working data stored within the random access memory 44. The computer program for controlling the central processing unit 42 may be stored within the read only memory 46. Whilst in this embodiment the computer program is stored in the read only memory 46, in other embodiments it may be stored on a hard disk drive, a removable media or indeed downloaded dynamically via the network link 48 into the working memory 44.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of processing input data words containing a plurality of abutting input data values, said method comprising:

(i) performing one or more data processing operations upon said input data word and a further data word to generate an intermediate result data word containing a plurality of abutting intermediate result data values dependent upon said input data values and corresponding portions of said further data word, said one or more data processing operations being such that a corrupting result bit from a first result data value extends into and changes a value of a second result data value;

(ii) calculating an error correcting data word in dependence upon said input data word and said further data word, said error correcting data word having a value that represents any corrupting result bits that may be generated by said performing;

(iii) combining said intermediate result data word and said error correcting data word to remove a change of value produced by a corrupting result bit and to generate an output data word, said output data word containing a plurality of abutting output data values being those generated if said one or more data processing operations were performed upon said plurality input data values and said corresponding portions of said further data word in isolation from one another.

2. A method as claimed in claim 1, wherein said one or more data processing operations include an addition operation.

3. A method as claimed in claim 2, wherein said corrupting result bit is a lowest order bit of said first result data value changing a value of a highest order bit of said second result data value.

4. A method as claimed in claim 3, wherein said error correcting data word is subtracted from said intermediate result data word.

5. A method as claimed in claim 4, wherein said combining includes shifting the result of claim 3 by one bit to divide said result data word by two.

6. A method as claimed in claim 3, wherein said error correcting data word is added to said intermediate result data word.

7. A method as claimed in claim 1, wherein said one or more data processing operations include a subtraction operation.

8. A method as claimed in claim 7, wherein said corrupting result bit is a lowest order bit of said first result data value changing a value of a highest order bit of said second result data value.

9. A method as claimed in claim 1, wherein said one or more data processing operations include a shift operation.

10. A method as claimed in claim 1, wherein said calculating includes performing an exclusive OR logical operation between said input data word and said further data word to generated an exclusive OR data word.

11. A method as claimed in claim 10, wherein said calculating includes performing an AND logical operation between said exclusive OR data word and a mask data word to generate said error correcting data word having bit values representing any corrupting result bits.

12. A method as claimed in claim 1, wherein said input data values represent adjacent signal values within a stream of signal values being processed.

13. A method as claimed in claim 12, wherein said data values represent adjacent pixel values.

14. A method as claimed in claim 1, wherein said input data values have an input data value bit-width and are variable over a full range of values allowed by said input data value bit-width.

15. A computer program product including a computer program for controlling a data processing apparatus to perform data processing in accordance with a method as claimed in claim 1.

16. Apparatus for processing input data words containing a plurality of abutting input data values, said apparatus comprising:

(i) processing logic operable to perform one or more data processing operations upon said input data word and a further data word to generate an intermediate result data word containing a plurality of abutting intermediate result data values dependent upon said input data values and corresponding portions of said further data word, said one or more data processing operations being such that a corrupting result bit from a first result data value extends into and change a value of a second result data value;

(ii) calculating logic operable to calculate an error correcting data word in dependence upon said input data word and said further data word, said error correcting data word having a value that represents any corrupting result bits generated by said processing logic;

(iii) combining logic operable to combine said intermediate result data word and said error correcting data word to remove any change of value produced by a corrupting result bit and to generate an output data word, said output data word containing a plurality of abutting output data values being those generated if said one or more data processing operations were performed upon said plurality input data values and said corresponding portions of said further data word in isolation from one another.

* * * * *